United States Patent [19]

Ugolini

[11] Patent Number: 5,437,753

[45] Date of Patent: Aug. 1, 1995

[54] METHOD FOR PRODUCING AN INTERIOR PANEL

[75] Inventor: Kenneth J. Ugolini, Leonard, Mich.

[73] Assignee: Ford Motor Company, Dearborn, Mich.

[21] Appl. No.: 173,034

[22] Filed: Dec. 27, 1993

[51] Int. Cl.⁶ .............................................. B32B 31/20
[52] U.S. Cl. .................................. 156/214; 156/251; 156/273.7
[58] Field of Search ...................... 156/212, 251, 272.2, 156/273.7

[56] References Cited

U.S. PATENT DOCUMENTS

| | | | |
|---|---|---|---|
| 3,075,862 | 1/1963 | Hoyer | 154/45.9 |
| 3,944,454 | 3/1976 | Burgheimer | 156/273 |
| 4,352,709 | 10/1982 | Urai et al. | 156/380.6 |
| 4,432,822 | 2/1984 | Adams et al. | 156/148 |
| 4,734,147 | 3/1988 | Moore | 156/212 |
| 4,771,150 | 9/1988 | Kon | 219/10.41 |
| 4,779,390 | 10/1988 | Repper et al. | 52/222 |
| 4,781,779 | 11/1988 | Nemoto | 156/219 |

FOREIGN PATENT DOCUMENTS 252721 4/1987 Japan .

Primary Examiner—Michael W. Ball
Assistant Examiner—David W. Reed
Attorney, Agent, or Firm—Damian Porcari; Roger L. May

[57] ABSTRACT

A method of producing an interior trim component using the steps of: impregnating a foam pad with a dielectrically heatable thermoplastic binder; placing the pad between a dielectrically heatable panel and decorative covering; compressing the pad; and applying an electric field to the pad and panel sufficient to heat and soften the thermoplastic binder and the panel whereby the thermoplastic binder bonds with the covering and panel.

4 Claims, 2 Drawing Sheets

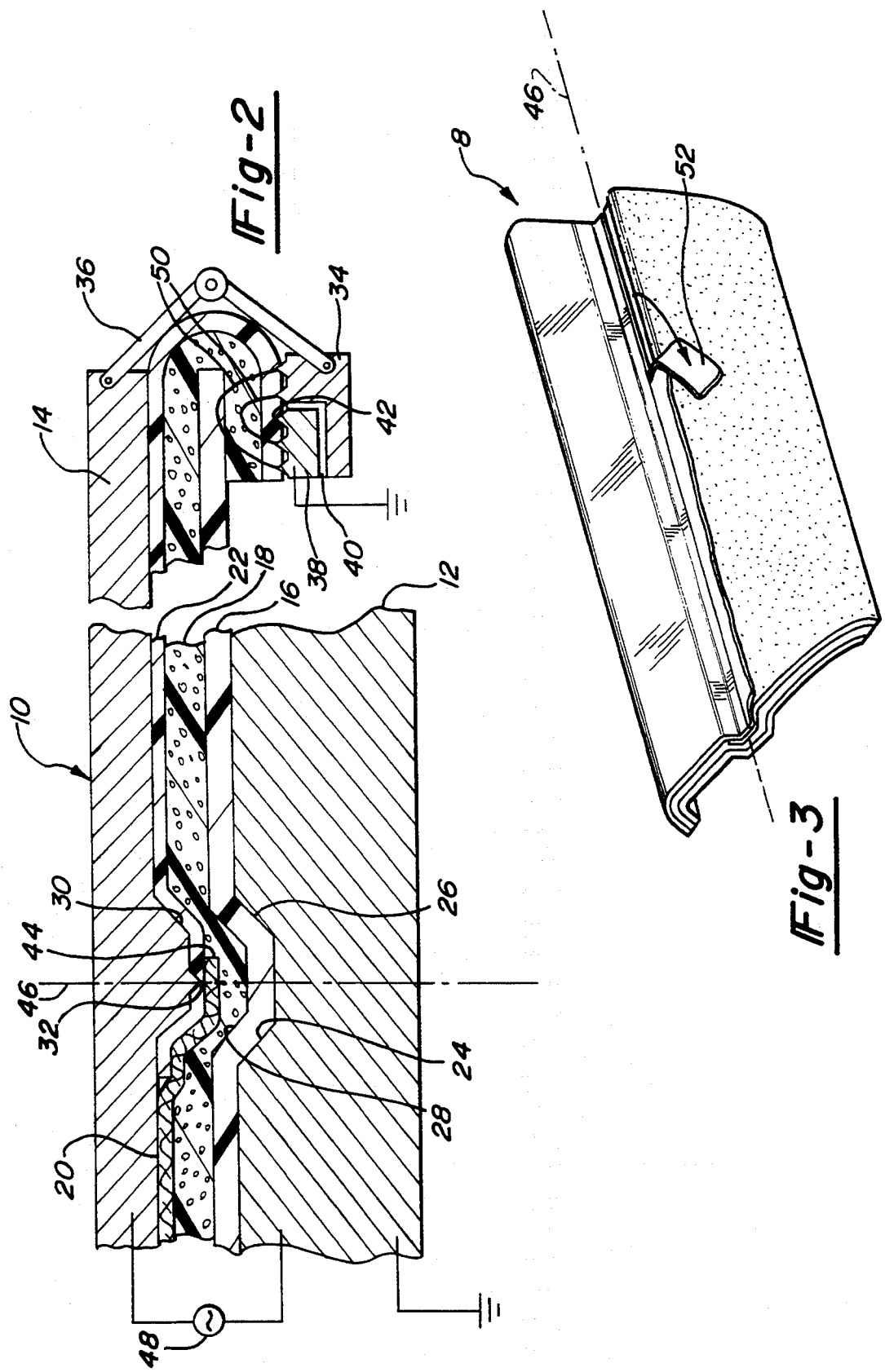

METHOD FOR PRODUCING AN INTERIOR PANEL

BACKGROUND OF THE INVENTION

1. Field of the Invention

The present invention relates to a method of producing an automotive trim panel. More specifically, the invention relates to a method of forming a seam between two areas on the panel.

2. Description of the Related Art

It is often desirable to produce an automotive interior trim panel having two different types of surfaces. For example, a panel may have a cloth surface and a vinyl surface. It is desirable to join these surfaces in a decorative seam without the use of moldings or fasteners. U.S. Pat. No. 4,779,390 teaches a method of forming an interior panel for an automobile by applying an adhesive layer atop a panel. Two coverings are placed atop the panel and brought together within the groove. This reference has the disadvantage that it requires adhesive to secure the covering atop the panel. It is difficult to use foam pads to provide loft beneath the covering when adhesives are used. It is also difficult to precisely align the covering edges within the groove.

U.S. Pat. No. 3,075,862 teaches a method of making panels by dielectrically bonding a plastic sheet to a panel. The panel may be covered by different thermoplastic sheets by either joining the sheets together or by partially overlying the sheets and trimming off any excess. The reference requires that the covering materials be heat fusible to one another. The seam is partially concealed within a recessed fleece layer, but does not provide as attractive an appearance as having been recessed within a grooved panel.

SUMMARY OF THE INVENTION

This invention is directed to a method of producing an interior trim component using the steps of: impregnating a foam pad with a dielectrically heatable thermoplastic binder; placing the pad between a dielectrically heatable panel and decorative covering; compressing the pad; and applying an electric field to the pad and panel sufficient to heat and soften the thermoplastic binder and the panel whereby the thermoplastic binder bonds with the covering and panel.

The invention permits the assembly, bonding and finishing of a covered panel using a single tool. A neat, trim joint line is formed in the panel that is concealed within a groove. The invention eliminates the need for fasteners, trim components or spray-on adhesives. The dielectric heating provides a short cycle time and does not require extended curing.

BRIEF DESCRIPTION OF THE DRAWINGS

FIG. 2 is a cross-section of the covering during the lamination process.

FIG. 3 shows tearing the excess covering along a tear line.

DETAILED DESCRIPTION OF THE DRAWINGS

Figure 1:
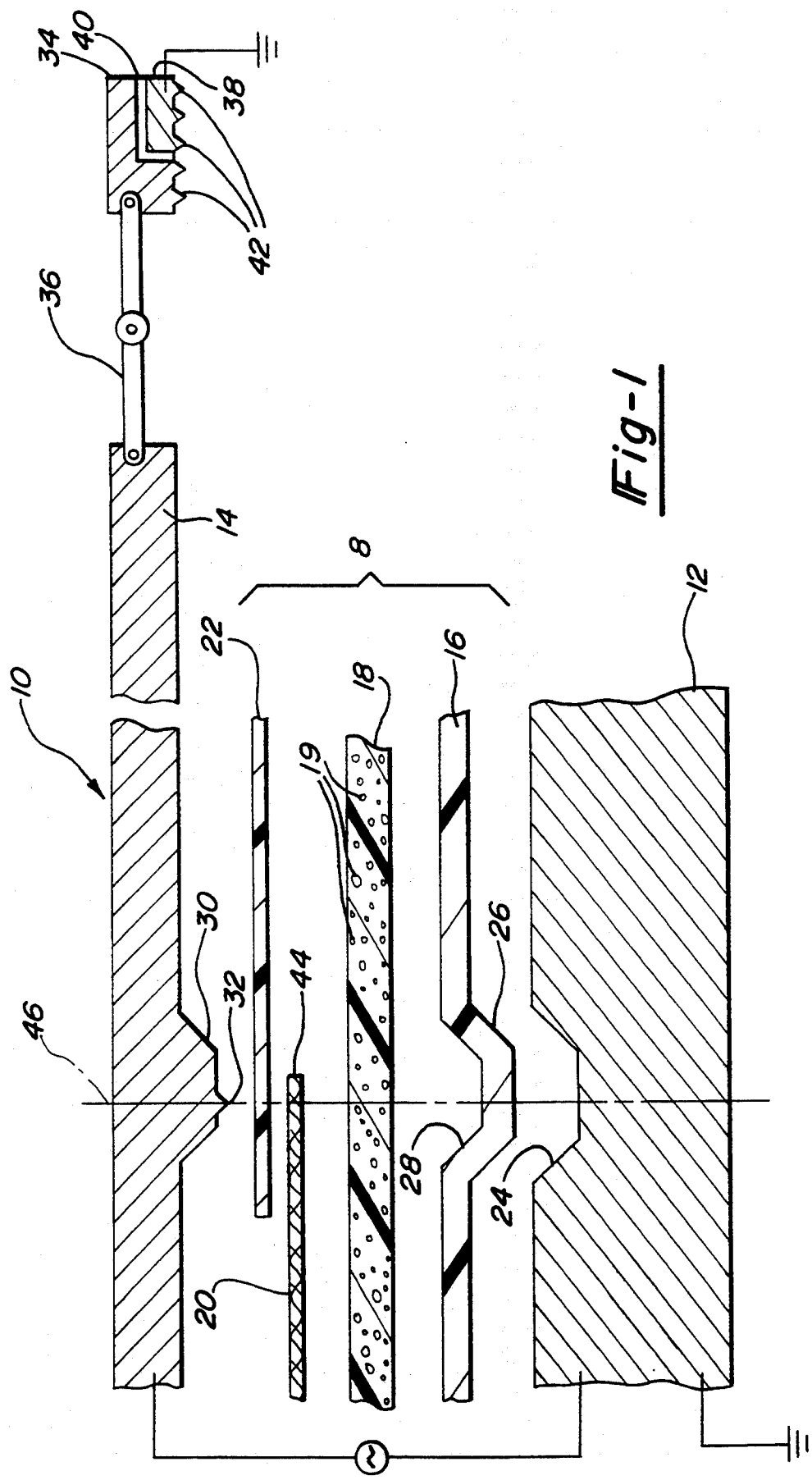
FIG. 1 is a cross-sectional exploded view of an apparatus practicing the present invention.

The invention provides a method for producing an interior automotive trim component 8. Illustrated in FIGS. 1-3 is an apparatus practicing the present invention. Component 8 is made using apparatus 10. Apparatus 10 comprises a lower electrode 12 and a mating upper electrode 14. Electrodes 12, 14 are operated by a hydraulic press between an open and closed position. Illustrated in FIG. 1 is apparatus 10 in an open position. Placed between electrodes 12, 14 is panel 16. Panel 16 is made from a dielectrically heatable material such as ABS. Especially preferred is ABS material without pigments or additives. Commercially acceptable products include DOW Magnum 342 EA Lo Gloss Auto Grade Natural with no regrind.

Foam pad 18, fabric 20 and covering 22 are placed atop panel 16 as illustrated. Electrode 12 receives U-shaped groove section 26 of panel 16. Section 26 has an interior surface 28 that receives the edges of fabric 20 and covering 22 to form a neat attractive seam.

Pad 18 is made from material that is not as easily dielectrically heatable as panel 16. Acceptable materials include glass fibers and polyester. Pad 18 is saturated with an easily dielectrically heatable thermoplastic binder 19 capable of bonding to panel 16. Binder 19 is normally in a dry state within pad 18 and does not require the venting of evaporative components. Suitable dielectrically heatable materials include vinyl, ABS and other thermoplastic resins or polymer blends. Binder 19 is selected from materials compatible with and heat fusible to panel 16, fabric 20 and covering 22. Pad 18 is saturated with approximately 60 percent by weight of binder 19. Binder 19 serves to bond pad 18, panel 16, fabric 20 and covering 22. Fabric 20 may be either a natural or synthetic fiber material in either woven or non-woven form. Alternatively, a fabric 20 may be leather.

Covering 22 is made from a dielectrically heatable, thermoplastic material. Especially preferred is a covering made from vinyl. Covering 22 is generally unbacked to permit easy tearing when severed.

Panel 16 is placed within lower electrode 12. Section 26 mates with electrode 12. Pad 18 overlies surface 28. Fabric 20 overlies pad 18. Fabric 20 includes edge 44 which extends slightly beyond tear line 46. Covering 22 overlies pad 18 and edge 44.

Electrodes 12, 14 are moved to the closed position as illustrated in FIG. 2. Projection 30 mates with surface 28. Pad 18, fabric 20 and covering 22 are all urged against surface 28. Knife edge 32 on projection 30 forms a tear line 46 on covering 22. Tear line 46 overlies edge 44. Edge 32 extends further within section 26 than the remaining surface of projection 30. Edge 32 imparts a tear line 46 on covering 22 that appears within surface 28. Radio Frequency (RF) generator 48 is connected between electrodes 10, 12. Generator 48 may either be an AC or a modulated DC generator. Suitable DC type generators operate at frequency of about 27.12 MHz with 30 kilowatts of power.

Generator 48 applies a RF electric field between electrodes 12, 14. The electric field causes a dielectric type heating effect to occur in panel 16, binder 19 and covering 22. Because the heating effect is exponentially related to the spacing between the electrodes, the greatest amount of heating occurs at the closest space between electrodes 12, 14. The minimum space generally occurs along tear line 46. Binder 19 within pad 18 mixes with the softened material atop surface 28. To assist in securing pad 18 to panel 16, portions of pad 18 are urged within the soften material of surface 28 to form a mechanical type attachment between pad 18 and panel 26. Binder 19 also bonds to fabric 20 and covering 22.

The area of covering 22 intersecting tear line 46 receives the greatest RF electric field. This area heats and softens more than other areas that contact projection 30. Knife edge 32 forms an indentation having a reduced thickness on covering 22. Molten material from covering 22 mixes with and bonds to overlapping edge 44. Stray fibers on fabric 20 are retained under covering 22.

The invention also permits the edge folding and sealing of a covered panel. Along the periphery of upper electrode 14 are a series of platens 34 which serve to hold and bond the edge of fabric 20 and covering 22. Platen 34 is attached to electrode 14 by means of hinge 36. Platen 34 is in the open position as shown in FIG. 1 when electrodes 12, 14 are in the opened position. Platen 34 is electrically connected to electrode 14 and also acts as an electrode. Electrically isolated from the main portion of platen 34 is electrode 38. Insulator 40 serves to electrically isolate electrode 38 from platen 34. Electrode 38 is electrically connected with electrode 12. Gripper surfaces 42 serve to grip fabric 20 and covering 22 and also serve to concentrate the RF electric field in the area between gripper surfaces 42.

Electrodes 12, 14 are moved in the closed position as illustrated in FIG. 2. Platen 34 is articulated to a closed position. Surfaces 42 grip the edge of covering 22 and fold the edge about the interior surface of panel 16. RF generator 48 creates an electric field between upper and lower electrodes 12, 14 and between platen 34 and electrode 38. The electric field between platen 34 and electrode 38 is illustrated by field lines 50. Field lines 50 are curved in the manner predicted by Gauss's law. The electric field dielectrically heats and softens binder 19 within pad 18 and secures covering 22, pad 18 and panel 16.

At the conclusion of the bonding process, platen 34 is retracted and electrodes 12, 14 are moved to the opened position. Newly laminated interior component 8 is removed from apparatus 10. Flap 52 of covering 22 extends beyond tear line 46. Flap 52 is separated from the remainder of covering 22 along tear line 46. The seam between fabric 20 and covering 22 occurs along tear line 46 and is concealed from view within groove 28.

The invention has been illustrated as a method of forming an automotive interior trim panel. Other decorative panels having a grooved interface between two different materials are also contemplated and are within the scope of the present invention and the following claims.

What is claimed:

1. A method of producing an interior trim component comprising the steps of:
    providing a grooved, dielectrically heatable panel;
    placing a foam pad containing a dielectrically heatable thermoplastic binder atop said groove;
    placing a fabric atop said pad;
    placing a dielectrically heatable thermoplastic covering atop said fabric;
    overlying a first electrode atop said covering, said electrode having a knife edge mating with said groove;
    applying an electric field between said first electrode and a second electrode placed adjacent said panel sufficient to heat and soften said panel, said binder and said covering, said knife edge imparting a tear line on said covering;
    urging said pad, said fabric and said covering towards said panel within said groove, wherein said binder bonds to said panel, said fabric and said covering; and
    tearing said covering along said tear line.

2. The method of claim 1, wherein said panel is made from ABS.

3. The method of claim 1, wherein said foam remains solid during said electric field application step.

4. The method of claim 1, wherein said binder is made from vinyl.

* * * * *